US012534878B2

(12) United States Patent
Konishi et al.

(10) Patent No.: US 12,534,878 B2
(45) Date of Patent: Jan. 27, 2026

(54) DRIVE CONTROL DEVICE FOR FLUID PRESSURE CYLINDER

(71) Applicant: Caterpillar SARL, Geneva (CH)

(72) Inventors: Isao Konishi, Akashi (JP); Sei Shimahara, Akashi (JP); Yoshitaka Kato, Akashi (JP)

(73) Assignee: Caterpillar SARL, Geneva (CH)

(*) Notice: Subject to any disclaimer, the term of this patent is extended or adjusted under 35 U.S.C. 154(b) by 0 days.

(21) Appl. No.: 18/598,493

(22) Filed: Mar. 7, 2024

(65) Prior Publication Data

US 2024/0301659 A1 Sep. 12, 2024

(30) Foreign Application Priority Data

Mar. 7, 2023 (JP) ................................. 2023-034407

(51) Int. Cl.
*E02F 9/22* (2006.01)
*F15B 11/048* (2006.01)
*F15B 21/08* (2006.01)

(52) U.S. Cl.
CPC .......... *E02F 9/2214* (2013.01); *F15B 11/048* (2013.01); *F15B 21/087* (2013.01); *F15B 2211/6336* (2013.01)

(58) Field of Classification Search
CPC .................. F15B 11/048; F15B 21/087; F15B 2211/6336
See application file for complete search history.

(56) References Cited

U.S. PATENT DOCUMENTS 5,431,086 A * 7/1995 Morita ................ F15B 15/2807 91/393
5,510,987 A * 4/1996 Song ....................... F15B 21/08 701/50

(Continued)

FOREIGN PATENT DOCUMENTS

JP 56153135 A 11/1981
JP 01182604 A 7/1989

(Continued)

*Primary Examiner* — Thomas E Lazo

(57) ABSTRACT

Problems: Provided is a drive control device for a fluid pressure cylinder that has good operability for expanding and contracting the fluid pressure cylinder in the vicinity of a stroke end. Solutions: A drive control device includes an expansion and contraction unit configured to expand and contract a fluid pressure cylinder in response to an operation of an operating body; a position detection unit configured to detect an expansion and contraction position of the fluid pressure cylinder; a speed detection unit configured to detect an expansion and contraction speed of the fluid pressure cylinder; a limiting unit configured to limit, according to the expansion and contraction position of the fluid pressure cylinder within a predetermined range from a stroke end and the expansion and contraction speed in a stroke end direction, the expansion and contraction speed of the fluid pressure cylinder in the stroke end direction by the expansion and contraction unit; and a stopping unit configured to stop expansion and contraction of the fluid pressure cylinder at a predetermined position by reducing an amount of a working fluid supplied to the fluid pressure cylinder as a distance of the fluid pressure cylinder from the predetermined position in the vicinity of the stroke end is shorter.

4 Claims, 3 Drawing Sheets

(56) References Cited

U.S. PATENT DOCUMENTS

| | | | | | |
|---|---|---|---|---|---|
| 5,546,847 | A * | 8/1996 | Rector | F15B 11/048 | 91/464 |
| 7,387,061 | B2 * | 6/2008 | Kobata | F15B 11/048 | 91/405 |
| 9,546,672 | B2 * | 1/2017 | Perkins | F15B 15/28 | |
| 9,810,246 | B2 * | 11/2017 | Akiyama | F15B 15/02 | |
| 10,151,333 | B2 * | 12/2018 | Besliu | F15B 15/1438 | |
| 10,480,160 | B2 * | 11/2019 | Tanishige | E02F 9/2296 | |
| 2004/0128868 | A1 * | 7/2004 | Helbling | F15B 11/048 | 37/348 |
| 2007/0033934 | A1 * | 2/2007 | Yamazaki | E02F 9/2214 | 60/459 |
| 2007/0130928 | A1 * | 6/2007 | Price | F15B 11/20 | 60/327 |
| 2008/0228323 | A1 * | 9/2008 | Laumer | B65F 3/06 | 700/285 |
| 2010/0115936 | A1 * | 5/2010 | Williamson | E02F 9/2214 | 60/446 |
| 2010/0162885 | A1 * | 7/2010 | Hughes, IV | E02F 3/844 | 91/361 |
| 2015/0047427 | A1 * | 2/2015 | Ikegami | E02F 9/264 | 73/168 |
| 2020/0217045 | A1 * | 7/2020 | Sherlock | E02F 9/262 | |
| 2022/0074165 | A1 * | 3/2022 | Iwasaki | E02F 9/2203 | |
| 2022/0120295 | A1 * | 4/2022 | Ueda | E02F 9/22 | |
| 2022/0381005 | A1 * | 12/2022 | Fujii | F15B 11/048 | |

FOREIGN PATENT DOCUMENTS

| | | | |
|---|---|---|---|
| JP | 06146328 | A | 5/1994 |
| JP | 07139508 | A | 5/1995 |
| JP | 2000130402 | A | 5/2000 |
| JP | 2000145717 | A | 5/2000 |
| JP | 2020118271 | A | 8/2020 |

* cited by examiner

| EXPANSION AND CONTRACTION POSITION | SC1 | EXPANSION AND CONTRACTION SPEED | SC2 | MP1 | NARROWING AMOUNT |
|---|---|---|---|---|---|
| LARGE | SMALL | LARGE | LARGE | SMALL | SMALL |
| SMALL | LARGE | SMALL | SMALL | SMALL | SMALL |
| LARGE | SMALL | SMALL | SMALL | SMALL | SMALL |
| SMALL | LARGE | LARGE | LARGE | LARGE | LARGE |

DRIVE CONTROL DEVICE FOR FLUID PRESSURE CYLINDER

CROSS-REFERENCE TO RELATED APPLICATION

This application claims priority under 35 USC §119 and the Paris Convention to Japanese Patent Application 2023-034407 filed on Mar. 7, 2023.

FIELD OF THE INVENTION

The present invention relates to a drive control device for a fluid pressure cylinder which expands and contracts the fluid pressure cylinder in response to an operation of an operating body.

BACKGROUND OF THE INVENTION

In the related art, in working machines that use a hydraulic cylinder, such as a hydraulic excavator, it is known that when the hydraulic cylinder reaches an expansion and contraction limit, that is, near a stroke end, an expansion and contraction speed is reduced, and the hydraulic cylinder is stopped before the stroke end, thereby alleviating an impact (for example, see Patent Document 1).

PRIOR ART DOCUMENTS

Patent Document

Patent Document 1: JP2020-118271A

SUMMARY OF THE INVENTION

Problems to be Solved by the Invention

However, in the above drive control device, when expansion and contraction of the hydraulic cylinder reaches the vicinity of the stroke end, an upper limit value of pilot pressure is defined, thereby slowing down the expansion and contraction speed. Therefore, for example, when it is desired to stop the expansion and contraction in the vicinity of the stroke end and then operate the hydraulic cylinder in a stroke end direction, the defined upper limit value of the pilot pressure limits the expansion and contraction speed of the hydraulic cylinder, and the hydraulic cylinder only moves very slowly, resulting in poor operability of the expansion and contraction in the vicinity of the stroke end.

The present invention has been made in view of the above points, and an object thereof is to provide a drive control device for a fluid pressure cylinder that has good operability for expanding and contracting the fluid pressure cylinder in the vicinity of a stroke end.

Means for Solving the Problem

The invention according to claim 1 is a drive control device for a fluid pressure cylinder including an expansion and contraction unit configured to expand and contract a fluid pressure cylinder in response to an operation of an operating body; a position detection unit configured to detect an expansion and contraction position of the fluid pressure cylinder; a speed detection unit configured to detect an expansion and contraction speed of the fluid pressure cylinder; a limiting unit configured to limit, according to the expansion and contraction position of the fluid pressure cylinder within a predetermined range from a stroke end and the expansion and contraction speed in a stroke end direction, the expansion and contraction speed of the fluid pressure cylinder in the stroke end direction by the expansion and contraction unit; and a stopping unit configured to stop expansion and contraction of the fluid pressure cylinder at a predetermined position by reducing an amount of a working fluid supplied to the fluid pressure cylinder as the fluid pressure cylinder approaches the predetermined position in the vicinity of the stroke end.

In the invention according to claim 2, the limiting unit in the drive control device for a fluid pressure cylinder according to claim 1 holds a maximum value of the expansion and contraction speed in the stroke end direction within the predetermined range from the stroke end, limits the expansion and contraction speed of the fluid pressure cylinder in the stroke end direction by the expansion and contraction unit according to the maximum value of the expansion and contraction speed and the expansion and contraction position, and releases the holding of the maximum value when the operating body reaches a predetermined neutral range.

In the invention according to claim 3, a function of the stopping unit in the drive control device for a fluid pressure cylinder according to claim 1 or 2 is switchable on and off.

In the invention according to claim 4, the expansion and contraction unit in the drive control device for a fluid pressure cylinder according to claim 1 or 2 forcibly reduces the expansion and contraction speed of the fluid pressure cylinder in the stroke end direction when a failure of at least one of the position detection unit and the speed detection unit is diagnosed.

Effect of the Invention

According to the invention according to claim 1, it is possible to ensure the expansion and contraction speed of the fluid pressure cylinder 6 in the stroke end direction while appropriately alleviating an impact caused by the fluid pressure cylinder 6 rushing toward a stroke end side, it is also possible to prevent a decrease in operability for expanding and contracting the fluid pressure cylinder due to accumulation of relief pressure caused by a relief operation at the stroke end, for example, and the operability for expanding and contracting the fluid pressure cylinder in the vicinity of the stroke end can be improved.

According to the invention according to claim 2, in the case in which an operator temporarily returns the operating body to the vicinity of a neutral position to reduce or stop the expansion and contraction speed in the stroke end direction when the expansion and contraction position of the fluid pressure cylinder is in the predetermined range from the stroke end, the expansion and contraction speed of the fluid pressure cylinder in the stroke end direction within the predetermined range from the stroke end is less likely to be limited, and operability of the fluid pressure cylinder in the vicinity of the stroke end is improved.

According to the invention according to claim 3, it is possible to cope with a case in which the operator wants to expand and contract the fluid pressure cylinder to the maximum extent to a mechanical stop position as necessary.

According to the invention according to claim 4, it is possible to prevent the fluid pressure cylinder from mechanically violently colliding with the cylinder end due to the limiting unit and/or the stopping unit not working properly due to the failure of at least one of the position detection unit and the speed detection unit.

DETAILED DESCRIPTION

Hereinafter, the present invention will be described in detail based on an embodiment shown in FIGS. 1 to 5.

Figure 1:
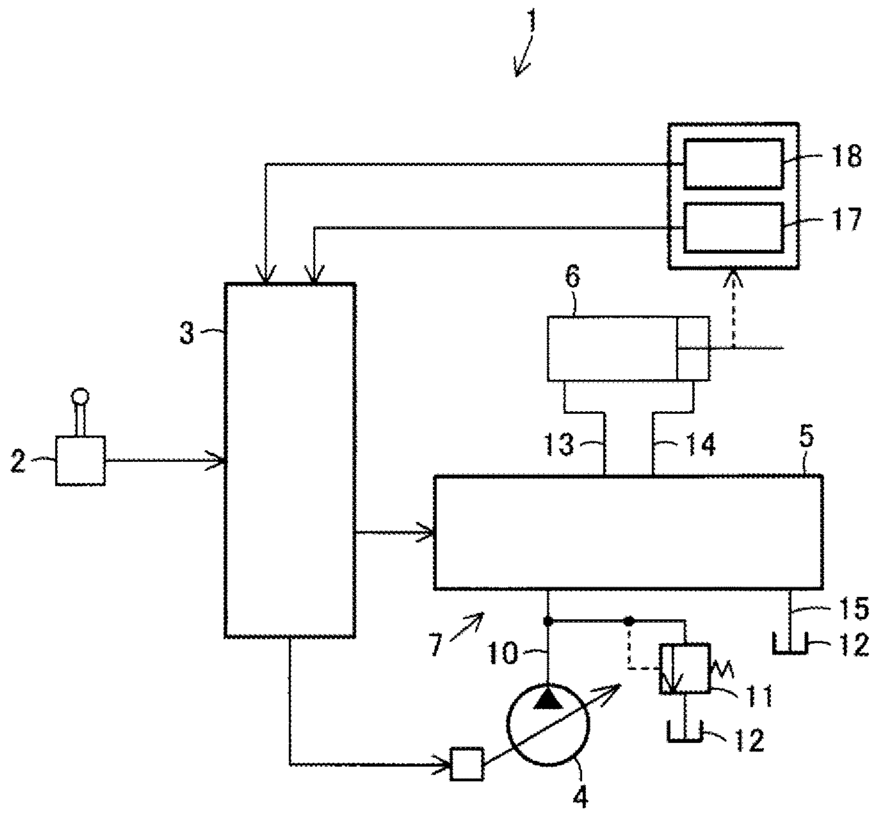
FIG. 1 is a circuit block diagram showing a fluid pressure circuit including an embodiment of a drive control device for a fluid pressure cylinder according to the present invention.

In FIG. 1, 1 denotes a drive control device for a fluid pressure cylinder. This drive control device 1 basically generates a control signal using a controller 3 based on an input signal indicating an amount of operation such as an angle of inclination of an operating body 2 such as a lever or a pedal, and controls a discharge flow rate of a working fluid from a pump 4 and/or an opening degree and an operating direction of an electromagnetic variable spool of a control valve 5 based on the generated control signal to control an expansion and contraction behavior of a fluid pressure cylinder 6. In other words, the controller 3, the pump 4, the control valve 5, and the like constitute an expansion and contraction unit 7 that expands and contracts the fluid pressure cylinder 6 in response to an operation of the operating body 2. The amount of operation of the operating body 2 can be electrically detected by, for example, an angle sensor.

An example of a fluid pressure circuit in the drive control device 1 is shown in FIG. 1. A pump passage 10 is connected from the pump 4 to the control valve 5, and a main relief valve 11 that controls circuit pressure to relief setting pressure is connected between the pump passage 10 and a tank 12. Further, supply paths 13 and 14 of the working fluid are respectively connected between the spool of the control valve 5 and a head side of the fluid pressure cylinder 6, and between the spool of the control valve 5 and a rod side of the fluid pressure cylinder 6, and by actuation of the spool of the control valve 5, the supply paths 13 and 14 are optionally connected to the pump passage 10 or to a return passage 15 to the tank 12, whereby the working fluid is supplied to and discharged from the fluid pressure cylinder 6.

The drive control device 1 according to the present embodiment further includes a position detection unit 17 that detects a position of the fluid pressure cylinder 6, and a speed detection unit 18 that detects an expansion and contraction speed of the fluid pressure cylinder 6. The position detection unit 17 may detect a position directly from the fluid pressure cylinder 6, for example, or may detect the position indirectly. As the position detection unit 17 and the speed detection unit 18, IMU sensors are preferably used.

Further, the drive control device 1 has a function (snubber speed control) of a limiting unit that limits the expansion and contraction speed of the fluid pressure cylinder 6 according to the position detected by the position detection unit 17 and the expansion and contraction speed in a stroke end direction detected by the speed detection unit 18 when the position of the fluid pressure cylinder 6 is in a snubber region which is a predetermined range from a stroke end. In other words, the snubber region refers to a range in which the expansion and contraction speed of the fluid pressure cylinder 6 is limited based on an expansion and contraction position and the expansion and contraction speed of the fluid pressure cylinder 6 when the fluid pressure cylinder 6 expands and contracts in the stroke end direction in a displacement range of the fluid pressure cylinder 6 in the vicinity of the stroke end. Furthermore, the drive control device 1 has a function (stop control) of forcibly stopping the expansion and contraction of the fluid pressure cylinder 6 at a predetermined position in the vicinity of the stroke end. In the present embodiment, the controller 3 has the functions of the limiting unit and the stopping unit.

Figure 2:
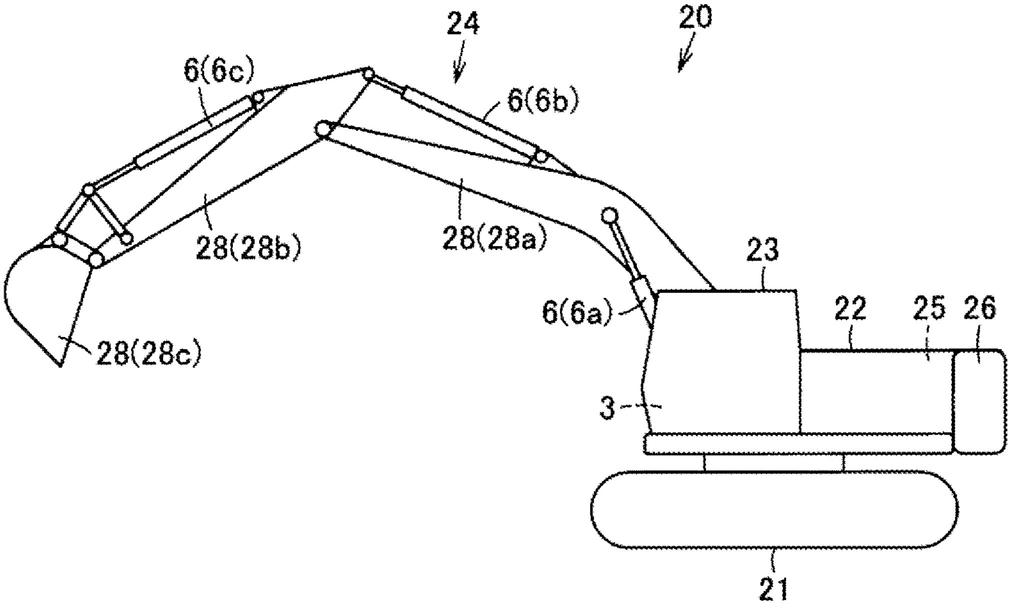
FIG. 2 is a side view showing an example of a working machine including the drive control device.

The drive control device 1 described above can be applied to any device using the fluid pressure cylinder 6, but in the present embodiment, an example is shown in which the drive control device 1 is mounted on a hydraulically driven working machine 20 shown in FIG. 2, which is operated by hydraulic oil pressure which is working fluid pressure. For example, the working machine 20 is exemplified by a hydraulic excavator type working machine.

That is, the working machine 20 according to the present embodiment is exemplified by a swivel-type working machine including a lower running body 21 and an upper swivel body 22, which is a swivel body that is swivelably provided on the lower running body 21. The upper swivel body 22 is equipped with a cab 23, which is an operator cab in which an operator is seated, and a working device 24. For example, the controller (in-vehicle controller) 3 is provided inside the cab 23.

The working device 24 is axially connected to the upper swivel body 22 on the side of the cab 23. In addition, the upper swivel body 22 is provided with a machine room 25 accommodating an engine, the pump 4 (FIG. 1), the control valve 5 (FIG. 1), and the like, and various tanks such as a hydraulic oil tank and a fuel tank are provided on a side opposite to the cab 23 with the working device 24 between them, and a counterweight 26 is mounted at an end opposite to the working device 24 with respect to the machine room 25 and the various tanks.

The working device 24 includes a plurality of link members 28, and these link members 28 are operated according to the expansion and contraction of the fluid pressure cylinder (hydraulic cylinder) 6. In the present embodiment, the working device 24 includes a boom **28*a* as a link member, an arm (stick) 28*b* as a link member, and a bucket 28*c* as a link member. A proximal end of the boom 28*a* is axially connected to the upper swivel body 22, a proximal end of the arm 28*b* is axially connected to a distal end of the boom 28*a*, and the bucket 28*c* is axially connected to a distal end of the arm 28*b*. The boom 28*a*, the arm 28*b*, and the bucket 28*c* are rotated by a boom cylinder 6*a* as a hydraulic cylinder that is a fluid pressure cylinder, an arm cylinder (stick cylinder) 6*b* as a hydraulic cylinder that is a fluid pressure cylinder, and a bucket cylinder 6*c* as a hydraulic cylinder that is a fluid pressure cylinder, respectively. The boom 28*a* is rotatable vertically with respect to a body, that is, the upper swivel body 22, the arm 28*b* is rotatable back and forth with respect to the boom 28*a*, and the bucket 28*c* is rotatable back and forth with respect to the arm 28*b*. A configuration of the working device 24 is not limited to this configuration, and may include four or more link members 28, or an appropriate attachment may be attached instead of the bucket 28***c*.

Next, the snubber speed control and the stop control of the above-mentioned control device 1 will be illustrated.

The snubber speed control is a control that limits the expansion and contraction speed of the fluid pressure cylinder 6 in the stroke end direction by setting an upper limit of the control signal for controlling the expansion and contraction of the fluid pressure cylinder 6 by the controller 3 according to the expansion and contraction position and the expansion and contraction speed in the stroke end direction of the fluid pressure cylinder 6 when the fluid pressure cylinder 6 is within the predetermined range (snubber region) from the stroke end, thereby reducing an impact when the expansion and contraction of the fluid pressure cylinder 6 rushes toward a stroke end side. That is, the snubber speed control is a control that limits the expansion and contraction speed of the fluid pressure cylinder 6 in the stroke end direction in the snubber region, but does not limit the expansion and contraction speed of the fluid pressure cylinder 6 in a direction opposite to the stroke end.

In the present embodiment, the snubber speed control increases the limitation on the expansion and contraction speed of the fluid pressure cylinder 6 in the stroke end direction as the expansion and contraction position of the fluid pressure cylinder 6 in the snubber region is closer to the stroke end and as the expansion and contraction speed in the stroke end direction is higher.

That is, in this snubber speed control, basically, the controller 3 reduces the upper limit of the control signal as the fluid pressure cylinder 6 approaches the stroke end in the snubber region. On the other hand, in the snubber region, the controller 3 relaxes the upper limit of the control signal as the expansion and contraction speed of the fluid pressure cylinder 6 in the stroke end direction decreases.

Preferably, when the fluid pressure cylinder 6 enters the snubber region while continuously expanding and contracting, the controller 3 holds a maximum value of the expansion and contraction speed of the fluid pressure cylinder 6 in the stroke end direction, and sets a degree of relaxation of the upper limit of the control signal based on the maximum value. However, assuming that after the fluid pressure cylinder 6 enters the snubber region, the operator temporarily stops the fluid pressure cylinder 6 or causes the fluid pressure cylinder 6 to decelerate below a predetermined speed, and then expands and contracts the fluid pressure cylinder 6 again in the stroke end direction, in the present embodiment, when the operating body 2 enters a predetermined neutral range, the controller 3 releases the holding of the maximum value of the expansion and contraction speed. The predetermined neutral range is, for example, a range that includes a neutral position of the operating body 2 and is less than half of a maximum operating range.

In the snubber speed control, the controller 3 sets the upper limit of the control signal by a product of the above two conditions.

In addition, the stop control is a control that sets the upper limit of the control signal for controlling the expansion and contraction of the fluid pressure cylinder 6 by the controller 3 such that as the fluid pressure cylinder 6 approaches the predetermined position in the vicinity of the stroke end in the snubber region, the supply of the working fluid to the fluid pressure cylinder 6 is gradually reduced by throttling a pump discharge amount and/or reducing the spool opening degree of the control valve 5, and the expansion and contraction is forcibly stopped at the predetermined position.

In this stop control, separately from the upper limit of the control signal set in the snubber speed control, the controller 3 reduces the upper limit of the control signal as the fluid pressure cylinder 6 approaches the predetermined position in the vicinity of the stroke end, and sets the control signal to substantially 0 to finally stop the fluid pressure cylinder 6 at the predetermined position in the vicinity of the stroke end. This stop control is set to be effective only in a very narrow region just before the stroke end, that is, just before mechanical contact with a cylinder end. The region in which this stop control is effective is set based on a size of the fluid pressure cylinder 6 and detection accuracy of each detection unit, and is assumed to be, for example, within 10 mm to 20 mm from the cylinder end.

Further, in the controller 3, among upper limits of the control signal set by the snubber speed control and the stop control, the smaller one is set as a true upper limit of the control signal.

Since there are a case in which the working machine 20 is parked, a case in which the working machine 20 performs a lifting work, or a case in which the operator wants to expand and contract the fluid pressure cylinder 6 to a mechanical stop position, such as a case in which the fluid pressure cylinder 6 (for example, the arm cylinder 6*b*) is forcibly relieved at the stroke end for warm-up operation, it is preferable that the stop control, that is, the function of the stopping unit in the controller 3, can be turned on and off as desired by the operator by operating a console or a switch provided in the cab 23.

Figure 3:
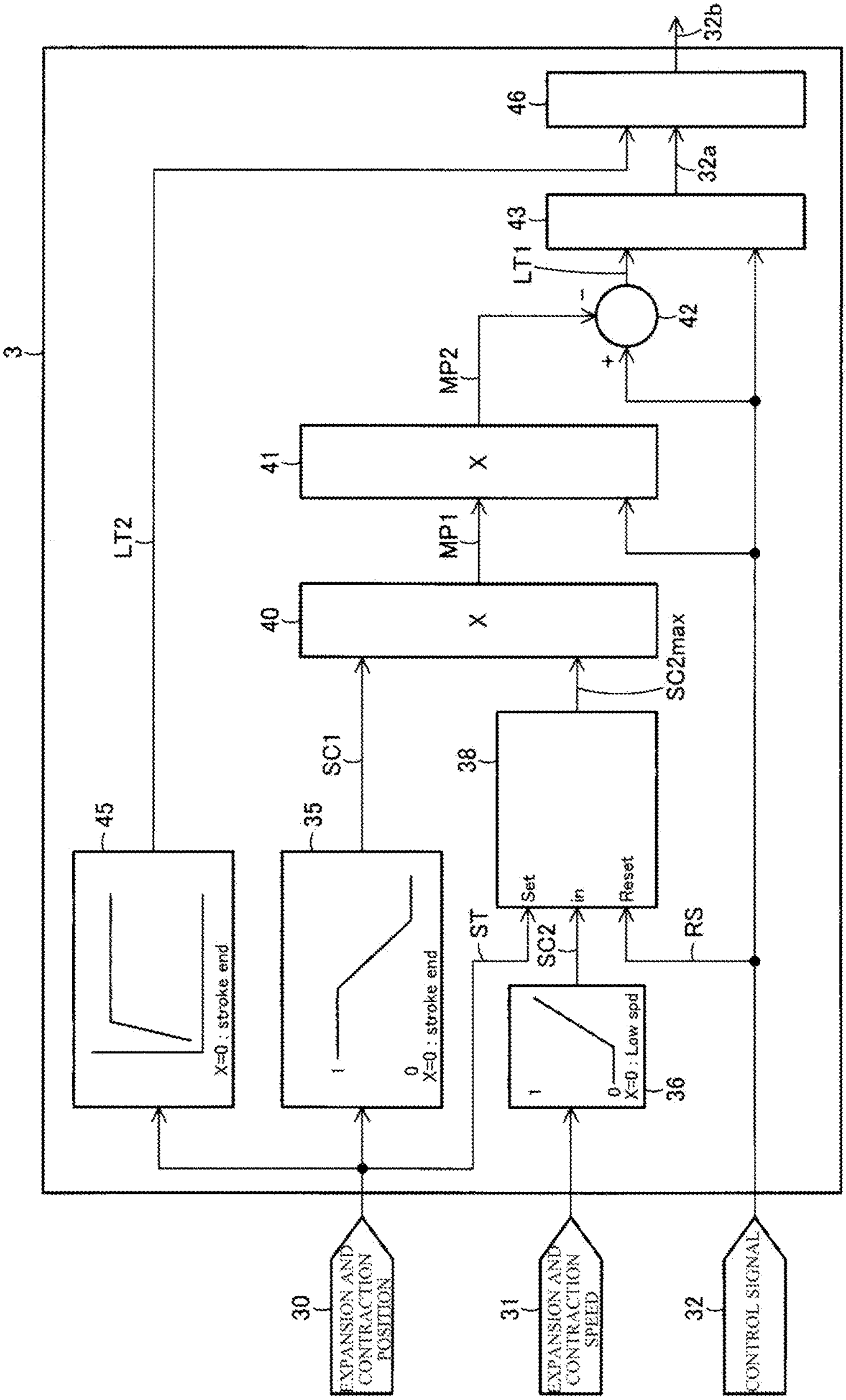
FIG. 3 is an explanatory diagram showing a control logic of the drive control device.

An example of a control logic for these controls is shown in FIG. 3. The control logic shown in FIG. 3 can be executed by, for example, software installed in the controller 3.

An expansion and contraction position 30 of the fluid pressure cylinder 6 (FIG. 1), an expansion and contraction speed 31 in the stroke end direction, and a control signal 32 corresponding to the amount of operation of the operating body 2 (FIG. 1) are input to the controller 3. Here, the expansion and contraction position 30 indicates a distance from the stroke end (expansion end or contraction end). For example, for the expansion and contraction position 30, if the fluid pressure cylinder 6 (FIG. 1) is the boom cylinder 6*a* (FIG. 2), an angle between the boom 28*a* and the arm 28*b*, which has a correlation with the expansion and contraction position, may be input.

An output value (scaler) SC1 is output for the input expansion and contraction position 30 based on a preset correspondence map 35. As shown in the figure, the correspondence map 35 is set to output a smaller value as the expansion and contraction position 30 is farther from the stroke end (toward the right side in the map). The output value SC1 is a value of 0 or more and 1 or less, and is set continuously for the expansion and contraction position 30 in the present embodiment. The larger the output value SC1 is, the more the control signal 32 is narrowed down.

On the other hand, an output value (scaler) SC2 is output for the input expansion and contraction speed 31 based on a preset correspondence map 36. As shown in the figure, the correspondence map 36 is set to output a larger value as the expansion and contraction speed 31 is higher (toward the right side in the map). The output value SC2 is a value of 0 or more and 1 or less, and is set continuously for the expansion and contraction speed 31 in the present embodiment. The larger the output value SC2 is, the more the control signal 32 is narrowed down.

The output value SC2 is input to a maximum value holding unit 38. In addition to the output value SC2, a set signal ST based on the expansion and contraction position 30 and a reset signal RS based on the control signal 32 can be input to the maximum value holding unit 38. The set signal ST is input to the maximum value holding unit 38 every control cycle when the expansion and contraction position 30 enters a snubber control region immediately before the snubber region, and each time the set signal ST is input, the output value SC2 is input to the maximum value holding unit 38. Here, the snubber control region refers to a range in which detection results of the position detection unit 17 (FIG. 1) and the speed detection unit 18 (FIG. 1) are input to the controller 3 in an expansion and contraction range of the fluid pressure cylinder 6 when the snubber speed control is executed on the fluid pressure cylinder 6. Further, the reset signal RS is input when it is detected that the operating body 2 (FIG. 1) has entered a predetermined neutral range. The maximum value holding unit 38 holds a maximum value of the output value SC2 until the reset signal RS is input, and outputs the maximum value as an output value SC2max. That is, as long as the operating body 2 (FIG. 1) does not enter the predetermined neutral range, in other words, as long as the operator operates the operating body 2 (FIG. 1) without returning the operating body 2 to the vicinity of the neutral position, the maximum value holding unit 38 holds the maximum value of the output value SC2.

Figures 4, 5:
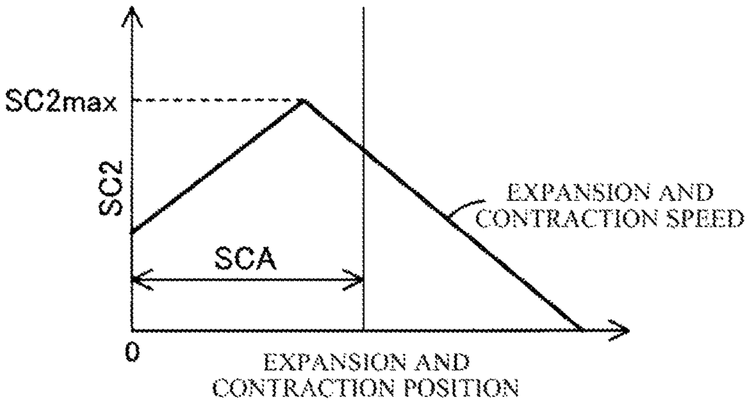
FIG. 4 is a graph showing an example of correspondence between a position of the fluid pressure cylinder and an output value from a maximum value holding unit in the drive control device.
FIG. 5 is a table showing an example of a relationship between the position and an expansion and contraction speed of the fluid pressure cylinder in the drive control device, and an output value and an upper limit thereof output according to the control logic in FIG. 3.

For example, FIG. 4 shows an example in which the operator gradually increases the expansion and contraction speed in the stroke end direction, and after the expansion and contraction position 30 enters a snubber control region SCA, gradually lowers the expansion and contraction speed in the stroke end direction. At this time, the maximum value holding unit 38 shown in FIG. 3 holds a maximum value (peak value in FIG. 4) in the snubber control region SCA as the output value SC2max.

The output values SC1 and SC2max are input to a multiplier 40, multiplied, and output as a multiplied value MP1. Further, the multiplied value MP1 and the control signal 32 are input to a multiplier 41, multiplied, and input to a subtracter 42 as a multiplied value MP2. In the subtracter 42, a value obtained by subtracting the multiplied value MP2 from the control signal 32 is outputted to a limiter 43 as an upper limit LT1 for the snubber speed control, and the control signal 32 input to the limiter 43 is output as a control signal 32*a* narrowed down to be equal to or less than this upper limit LT1.

In other words, as shown in FIG. 5, in the snubber speed control, when the expansion and contraction position 30 is small, that is, when the fluid pressure cylinder 6 (FIG. 1) is close to the stroke end and the expansion and contraction speed in the stroke end direction is large, the control signal is largely narrowed down, and under other conditions, the control signal is set to be little narrowed down.

Also, returning to FIG. 3, an upper limit LT2 for the stop control is output for the input expansion and contraction position 30 based on a preset correspondence map 45. As shown in the figure, the correspondence map 45 is set to output a smaller value as the expansion and contraction position 30 becomes smaller, that is, closer to the stroke end only when the expansion and contraction position 30 is in the vicinity of the stroke end (in the vicinity of the left end in the map), and to output a constant value at other conditions. In other words, this upper limit LT2 is effective only when the expansion and contraction position 30 is in the vicinity of the stroke end, and basically does not act on other expansion and contraction positions 30. In the present embodiment, the upper limit LT2 is set continuously with respect to the expansion and contraction position 30.

Further, the upper limit LT2 is input to a limiter 46, and the limit signal 32*a* input to the limiter 46 is output as a control signal 32*b* narrowed down to be equal to or less than the upper limit LT2.

Further, since the stop control is turned on and off according to switching performed by the operator, an output from the controller 3 becomes the control signal 32*b* or the control signal 32*a* depending on whether the stop control is turned on or off.

Further, by the control signal 32*a* or the control signal 32*b* output from the controller 3, the discharge flow rate of the pump 4 shown in FIG. 1 and/or the opening degree and the operating direction of the spool of the control valve 5 are controlled, whereby the above snubber speed control and the stop control are implemented.

The correspondence maps 35, 36, and 45 may be tables in which output values are set discontinuously with respect to input values.

As described above, according to one embodiment, by limiting the expansion and contraction speed of the fluid pressure cylinder 6 in the stroke end direction according to the expansion and contraction position of the fluid pressure cylinder 6 within the predetermined range from the stroke end, that is, in the snubber region, and the expansion and contraction speed thereof in the stroke end direction, the expansion and contraction speed of the fluid pressure cylinder 6 in the stroke end direction can be ensured while appropriately reducing the impact caused by the fluid pressure cylinder 6 rushing toward the stroke end side.

For example, in the case in which based only on the expansion and contraction position of the fluid pressure cylinder 6 within the predetermined range from the stroke end, that is, in the snubber region, the expansion and contraction speed of the fluid pressure cylinder 6 in the stroke end direction is limited as the expansion and contraction position of the fluid pressure cylinder 6 is closer to the stroke end, when the expansion and contraction position enters the snubber region and the operator wants to further expand and contract the fluid pressure cylinder 6 in the stroke end direction, since an upper limit value of the expansion and contraction speed is uniquely defined depending on the expansion and contraction position, the closer the expansion and contraction position is to the stroke end, the more the expansion and contraction speed is reduced, which may cause a problem that the fluid pressure cylinder 6 can only be moved very slowly. For this reason, in the case of an operation in which the expansion and contraction of the fluid pressure cylinder 6 is temporarily stopped in the snubber region and the fluid pressure cylinder 6 is moved toward the stroke end direction again, since the upper limit is defined depending on the expansion and contraction position, the pump flow rate is small, a spool stroke of the control valve 5 is also small, and an opening amount of a bypass spool that bypasses the pump flow rate to the tank 12 is also large, so that the expansion and contraction speed and a cylinder thrust of the fluid pressure cylinder 6 are extremely small.

In contrast, in the present embodiment, by setting the limitation on the expansion and contraction speed in consideration of the expansion and contraction speed of the fluid pressure cylinder 6 in the stroke end direction in the snubber region, it is possible to appropriately alleviate the impact caused by the fluid pressure cylinder 6 rushing toward the stroke end side, and when the expansion and contraction speed in the stroke end direction in the snubber region is small, it is possible to relax the limitation on the expansion and contraction speed to expand and contract the fluid pressure cylinder 6 toward the stroke end side, and to ensure the cylinder thrust in the vicinity of the stroke end, without excessively slowing down the expansion and contraction of the fluid pressure cylinder 6 in the vicinity of the stroke end. Therefore, when the fluid pressure cylinder 6 is slowly expanded during, for example, lifting work of the working machine 20, the cylinder thrust is less likely to be limited, and operability is improved.

Further, the drive control device 1 reduces an amount of the working fluid supplied to the fluid pressure cylinder 6 as the fluid pressure cylinder 6 approaches the predetermined position in the vicinity of the stroke end, and stops (software stops) the expansion and contraction of the fluid pressure cylinder 6 at the predetermined position, regardless of the expansion and contraction speed of the fluid pressure cylinder 6, and therefore the drive control device 1 can prevent accumulation of relief pressure, that is, confinement pressure, caused by a relief operation in which the main relief valve 11 is operated as pump pressure increases by further forcing the operation of the operating body 2 at the stroke end, and when the fluid pressure cylinder 6 is expanded and contracted in the direction opposite to the stroke end, the confinement pressure is released, so that the fluid pressure cylinder 6 does not tend to pop out during initial movement. For example, even when the operator wants to slowly move the arm cylinder 6*b* in an extension direction from the vicinity of the stroke end, such as when performing horizontally pulling work of the working machine 20, the operability is improved.

Therefore, the operability for expanding and contracting the fluid pressure cylinder 6 in the vicinity of the stroke end is good.

When the operating body 2 reaches the predetermined neutral range, the controller 3 releases the holding of the maximum value of the expansion and contraction speed in the snubber speed control, so that in the case in which the operator temporarily returns the operating body 2 to the vicinity of the neutral position to reduce or stop the expansion and contraction speed in the stroke end direction when the expansion and contraction position of the fluid pressure cylinder 6 is in the snubber region, the expansion and contraction speed of the fluid pressure cylinder 6 in the stroke end direction in the snubber region from the stroke end is less likely to be limited, and the cylinder thrust in the vicinity of the stroke end can be obtained.

Since the function of the stopping unit, that is, the stop control of the controller 3, can be switched on and off, it is possible to cope with the case in which the operator wants to expand and contract the fluid pressure cylinder 6 to the maximum extent to the mechanical stop position as necessary. Moreover, even if the function of the stopping unit, that is, the stop control of the controller 3, is turned off, the function of the limiting unit, that is, the snubber speed control is not affected, so that the impact caused by the fluid pressure cylinder 6 rushing toward the stroke end side is appropriately alleviated.

Preferably, the expansion and contraction unit 7 forcibly reduces the expansion and contraction speed of the fluid pressure cylinder 6 in the stroke end direction when a failure of at least one of the position detection unit 17 and the speed detection unit 18 is diagnosed. The failure of the position detection unit 17 and the speed detection unit 18 is detected, for example, by inputting a result of disconnection detection to the controller 3. In this case, it is possible to prevent the fluid pressure cylinder 6 from mechanically violently colliding with the cylinder end due to the function of the limiting unit and/or the stopping unit, that is, the snubber speed control and/or the stop control described above not working properly due to the failure of at least one of the position detection unit 17 and the speed detection unit 18.

INDUSTRIAL APPLICABILITY

The present invention can be utilized in the industry in which a drive control device for a fluid pressure cylinder and a working machine are manufactured and sold.

What is claimed is:

1. A drive control device for a fluid pressure cylinder, comprising:

an expansion and contraction unit configured to expand and contract a fluid pressure cylinder in response to an operation of an operating body;

a position detection unit configured to detect an expansion and contraction position of the fluid pressure cylinder;

a speed detection unit configured to detect an expansion and contraction speed of the fluid pressure cylinder;

a limiting unit configured to limit, according to the expansion and contraction position of the fluid pressure cylinder within a predetermined range from a stroke end and the expansion and contraction speed in a stroke end direction, the expansion and contraction speed of the fluid pressure cylinder in the stroke end direction by the expansion and contraction unit; and a stopping unit configured to stop expansion and contraction of the fluid pressure cylinder at a predetermined position by reducing an amount of a working fluid supplied to the fluid pressure cylinder as the fluid pressure cylinder approaches the predetermined position in the vicinity of the stroke end, the amount of working fluid being reduced according to the expansion and contraction position and the expansion and contraction speed in a stroke end direction, wherein a function of the stopping unit is switchable on and off.

2. The drive control device for a fluid pressure cylinder according to claim 1, wherein:

the limiting unit holds a maximum value of the expansion and contraction speed in the stroke end direction within the predetermined range from the stroke end, limits the expansion and contraction speed of the fluid pressure cylinder in the stroke end direction by the expansion and contraction unit according to the maximum value of the expansion and contraction speed and the expansion and contraction position, and releases the holding of the maximum value when the operating body reaches a predetermined neutral range.

3. The drive control device for a fluid pressure cylinder according to claim 1, wherein:

the expansion and contraction unit forcibly reduces the expansion and contraction speed of the fluid pressure cylinder in the stroke end direction when a failure of at least one of the position detection unit and the speed detection unit is diagnosed.

4. A drive control device for a fluid pressure cylinder, comprising:

an expansion and contraction unit configured to expand and contract a fluid pressure cylinder in response to an operation of an operating body;

a position detection unit configured to detect an expansion and contraction position of the fluid pressure cylinder;

a speed detection unit configured to detect an expansion and contraction speed of the fluid pressure cylinder;

a limiting unit configured to limit, according to the expansion and contraction position of the fluid pressure cylinder within a predetermined range from a stroke end and the expansion and contraction speed in a stroke end direction, the expansion and contraction speed of the fluid pressure cylinder in the stroke end direction by the expansion and contraction unit; and a stopping unit configured to stop expansion and contraction of the fluid pressure cylinder at a predetermined position by reducing an amount of a working fluid supplied to the fluid pressure cylinder as the fluid pressure cylinder approaches the predetermined position in the vicinity of the stroke end, and a function of the stopping unit is switchable on and off.

* * * * *